(12) United States Patent
Paternostro et al.

(10) Patent No.: US 7,296,188 B2
(45) Date of Patent: Nov. 13, 2007

(54) FORMAL TEST CASE DEFINITIONS

(75) Inventors: Luiz Marcelo Aucelio Paternostro, Markham (CA); Marius Slavescu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 10/290,353

(22) Filed: Nov. 7, 2002

(65) Prior Publication Data

US 2004/0010735 A1   Jan. 15, 2004

(30) Foreign Application Priority Data

Jul. 11, 2002   (CA) .................................. 2393043

(51) Int. Cl.
*G06F 11/00* (2006.01)
(52) U.S. Cl. ......................................... 714/38; 717/124
(58) Field of Classification Search .................. 714/38; 717/124
See application file for complete search history.

(56) References Cited

U.S. PATENT DOCUMENTS

| | | | | |
|---|---|---|---|---|
| 5,021,997 A | * | 6/1991 | Archie et al. .................. 714/31 |
| 5,414,836 A | | 5/1995 | Baer et al. |
| 5,671,351 A | * | 9/1997 | Wild et al. ..................... 714/38 |
| 5,754,755 A | * | 5/1998 | Smith, Jr. ...................... 714/38 |
| 5,778,169 A | * | 7/1998 | Reinhardt ..................... 714/38 |
| 6,031,990 A | * | 2/2000 | Sivakumar et al. .......... 717/124 |
| 6,067,639 A | * | 5/2000 | Rodrigues et al. ............. 714/38 |
| 6,134,674 A | * | 10/2000 | Akasheh ....................... 714/33 |
| 6,148,277 A | * | 11/2000 | Asava et al. .................. 703/22 |
| 6,182,245 B1 | * | 1/2001 | Akin et al. .................... 714/38 |
| 6,219,829 B1 | | 4/2001 | Sivakumar et al. |
| 7,058,857 B2 | * | 6/2006 | Dallin .......................... 714/38 |
| 2001/0052089 A1 | * | 12/2001 | Gustavsson et al. .......... 714/38 |
| 2003/0212924 A1 | * | 11/2003 | Avvari et al. ................. 714/38 |
| 2004/0015846 A1 | * | 1/2004 | Haisraeli ...................... 717/115 |
| 2004/0088677 A1 | * | 5/2004 | Williams ..................... 717/104 |

FOREIGN PATENT DOCUMENTS

| | | |
|---|---|---|
| JP | 1063116 A | 3/1989 |
| JP | 1135348 A | 5/1989 |

* cited by examiner

*Primary Examiner*—Yolanda L Wilson
(74) *Attorney, Agent, or Firm*—Duke W. Yee; Herman Rodriguez; Peter B. Manzo

(57) ABSTRACT

A model of a test case is created which is used to formally define the various portions of a test case and the test script which implements the test case. In one aspect, the invention processes an existing test script to identify the components in the test script which correspond to the portions defined in a model of a test case. These identified portions are then used to create a test script which corresponds to the structure of the test model. Additionally, embodiments of the invention enable the creation of test scripts, in one or more languages, from a test case which conforms to the model. As will be appreciated, the model employed could be modified or altered to provide additional advantages such as enabling extensions of the model to be created.

14 Claims, 12 Drawing Sheets

Figure 3A

```
public class MoneyTest extends TestCase {
    private Money f12CHF;
    private Money f14CHF;
    private Money f28USD;
    // This method will be invoked before each test method
    protected void setUp() {
        f12CHF = new Money(12, "CHF");
        f14CHF = new Money(14, "CHF");
        f28USD = new Money(28, "USD");
    }
    // This method will be invoked after each test method
    protected void tearDown() {
        f12CHF = null;
        f14CHF = null;
        f28USD = null;
    }
    // Test method
    public void testMoneyMoneyBag() {
        // [12 CHF] + [14 CHF] + [28 USD] == {[26 CHF][28 USD]}
        Money bag[] = { f26CHF, f28USD };
        MoneyBag expected = new MoneyBag(bag);
        assertEquals(expected, f12CHF.add(f28USD.add(f14CHF)));
    }
    // Test method
    public void testSimpleAdd() {
        Money m12CHF = new Money(12, "CHF");
        Money m14CHF = new Money(14, "CHF");
        Money expected = new Money(26, "CHF");
        Money result = m12CHF.add(m14CHF);
        assertTrue(expected.equals(result)); // Assert example
    }
    // Suite method
    public static Test suite() {
        // instantiates the suite
        TestSuite suite = new TestSuite();
        // add specific test methods to the suite
        suite.addTest(new MoneyTest("testSimpleAdd"));
        // add a whole test case to the suite
        suite.addTestSuite(AnotherMoneyTest.class);
        // returns the suite
        return suite;
```

Figure 7A

```
package test;

import java.util.Iterator;
import java.util.Vector;

import org.eclipse.jdt.core.IMethod;
import org.eclipse.jdt.core.IType;

// This class is used to derive a JUnit TestCase/TestSuite into the definition model
public class DeriveJUnitTest { public static void main(String[] args) {
        DeriveJUnitTest loader = new DeriveJUnitTest();
        //JUnitTestCase.java is a sample JUnit test case
        TestcaseDefinition tcd = loader.loadFile("JUnitTestCase.java");
        //this will save the whole testcase definition hierarchy;
        tcd.save();
    }

//loads in the model of a test case and all its associated test cases
    public TestcaseDefinition loadFile(String fileName) {
        TestcaseDefinition tcd = new TestcaseDefinition();
        BlockDefinition b = new BlockDefinition();
        tcd.setBlock(b);
        IType type = loadClass(fileName);
        tcd.setDescription(getJavaDescription(type));
        if (extendsTestCase(type)) {
            if (hasSuiteMethod(type)) {
                // this will derive the suite method in a set of JavaTaskDefinition, BlockDefinition or TestcaseDefinition
                deriveSuiteMethod(getSuiteMethod(type), b);
            } else {
                Vector testMethods = new Vector();
                parseTestMethods(type, testMethods);
                for (Iterator iterator = testMethods.iterator(); iterator.hasNext();) {
                    IMethod method = (IMethod) iterator.next();
                    deriveTestMethod(method, b);
                    deriveAssertCalls(method, b);
                }
            }
        }
    }
```

Figure 7B

```
} else if (extendsTestSuite(type)) {
    if (hasSuiteMethod(type)) {
        // this will derive the suite method in a set of JavaTaskDefinition, BlockDefinition or
                        TestcaseDefinition
        deriveSuiteMethod(type, b);
    } else
        throw new Exception("suite() method doesn't exist on a top level test suite");
} else
    throw new Exception(fileName + " class is not a valid JUnit test case !");

return tcd;
}                                                                                          ⌐ 612

//loads the file in an internal class representation
public IType loadClass(String fileName) {
    return null;
}

// This method checks if the object is a subclass of JUnit TestCase class
public boolean extendsTestCase(IType type) {
    return false;                                                                          ⎫
}                                                                                          ⎬ 602
                                                                                           ⎭
// This method checks if the object is a subclass of JUnit TestSuite class
public boolean extendsTestSuite(IType type) {
    return false;
}

// This method introspects the testcase looking for the suite method
public boolean hasSuiteMethod(IType o) {
    return false;                                                                          ⌐ 608
}

//This method introspects the TestCase and retrieves all the test methods + setUp and tearDown
public void parseTestMethods(IType type, Vector testMethods) {                             ⌐ 606
}

//This method parses the suite() method and retrieves the first level of suite members (added through
    addTest and addTestSuite)
public void parseSuiteMethod(IMethod method, Vector suiteMembers) {
}
```

Figure 7C

```
// This method returns the description of this method (for example Java comments for that method)
public String getJavaDescription(IMethod method) {
    return null;
}

// This method returns the description of this type (for example Java comments for that type)
public String getJavaDescription(IType type) {
    return null;
}

// This method returns the description of the asserts from this method
public String getAssertsDescription(IMethod method) {
    return null;
}

// This method returns an internal representation of the suite() method
public IMethod getSuiteMethod(IType type) {
    return null;
}

// This method will derive setUp, tearDown and testXXX methods
public void deriveTestMethod(IMethod method, BlockDefinition b) {
    if (method.getElementName().equals("setUp")) {
        JavaSetUpDefinition jsd = new JavaSetUpDefinition();
        jsd.setDescription(getJavaDescription(method));
        b.addChild(jsd);
    } else if (method.getElementName().equals("tearDown")) {
        JavaCleanUpDefinition jcd = new JavaCleanUpDefinition();
        jcd.setDescription(getJavaDescription(method));
        b.addChild(jcd);
    } else if (method.getElementName().startWith("test")) {
        JavaTaskDefinition jtd = new JavaTaskDefinition();
        jtd.setDescription(getJavaDescription(method));
        b.addChild(jtd);
    }
}
```

```
// This method will derive all assert calls into an JavaVerificationPointDefinition
public void deriveAssertCalls(IMethod method, BlockDefinition b) {
    if (method.getElementName().startWith("test") && existsAssertCalls(method)) {
        JavaVerificationPointDefinition jvpd = new JavaVerificationPointDefinition();
        jvpd.setDescription(getAssertsDescription(method));
        b.addChild(jsd);
    }
}

// This method will derive the suite method in a set of JavaTaskDefinition, BlockDefinition or TestcaseDefinition
public void deriveSuiteMethod(IMethod method, BlockDefinition b) {
    if (method.getElementName().equals("suite")) {
        Vector suiteMembers = new Vector();
        parseSuiteMethod(method, suiteMembers);
        for (Iterator iterator = suiteMembers.iterator(); iterator.hasNext();) {
            Object o = iterator.next();
            if (o instanceof IMethod) {
                IMethod method = (IMethod) o;
                if (method.getElementName().equals("suite")) {
                    TestcaseDefinition tcd = new TestcaseDefinition();
                    BlockDefinition b1 = new BlockDefinition();
                    tcd.setBlock(b1);
                    tcd.setDescription(getJavaDescription(method.getDeclaringType()));
                    b.addChild(tcd);
                    deriveTestCase(method.getDeclaringType(), b1, true);
                } else {
                    deriveTestMethod(method, b);
                    deriveAssertCalls(method, b);
                }
            } else if (o instanceof IType) {
                IType type = (IType) o;
                TestcaseDefinition tcd = new TestcaseDefinition();
                BlockDefinition b1 = new BlockDefinition();
                tcd.setBlock(b1);
                tcd.setDescription(getJavaDescription(type));
                b.addChild(tcd);
                deriveTestCase(type, b1, false);
            }
        }
    }
}
```

Figure 7E

```
// This method will derive any non top level test case/test suite
public void deriveTestCase(
    IType type,
    BlockDefinition block,
    boolean suiteOnly) {
    if (extendsTestCase(type)) {
        if (hasSuiteMethod(type)) {
            // this will derive the suite method in a set of JavaTaskDefinition, BlockDefinition or TestcaseDefinition
            deriveSuiteMethod(getSuiteMethod(type), block);        ⎯722
        } else if (!suiteOnly) {
            Vector testMethods = new Vector();
            parseTestMethods(type, testMethods);
            for (Iterator iterator = testMethods.iterator(); iterator.hasNext();) {
                IMethod method = ((IMethod) iterator.next();
                //this will derive the test method in a JavaTaskDefinition
                deriveTestMethod(method, block);
                deriveAssertCalls(method, block);        ⎯728
            }
        } else
            throw new Exception(
                type.getFullyQualifiedName + " class is not a valid JUnit test case !");
    } else if (extendsTestSuite(type)) {
        if (hasSuiteMethod(type)) {
            // this will derive the suite method in a set of JavaTaskDefinition, BlockDefinition or TestcaseDefinition
            deriveSuiteMethod(type, block);        ⎯726
        } else
            throw new Exception(
                type.getFullyQualifiedName + " class is not a valid JUnit test case !");
    }
}
```

⎯730

FORMAL TEST CASE DEFINITIONS

FIELD OF THE INVENTION

The present invention is directed to computer application testing and, more particularly, to deriving formal test case definitions.

BACKGROUND OF THE INVENTION

Most computer applications (hereinafter "applications") are very complex systems that, due to their complexity, require significant testing to ensure that the application will execute as desired.

To facilitate the testing of applications, test cases or test suites (essentially a collection of test cases) are designed, implemented and used to test a portion or the whole of an application (often referred to as the subject under test). In many applications, these test cases manipulate the external facade or interface of the subject under test. The results of these test cases are then analyzed and evaluated. As many applications are quite complex, several, sometimes hundreds, of test cases are used for the testing of a single application. A "test case" is used herein to describe the type, subject under test and items to be tested. A test case is implemented (in a scripting or programming language) to create a "test script".

For example, a database application may need to be tested to determine whether data can be added to the database (this is the test case). A test script would need to be created to implement the test case. The exemplary test script could include several steps, instructions or processes to test this aspect of the application may include: gaining access to update the database, transmitting the update request; receiving confirmation that the update request has been executed; reading from the database to determine if the data in the update request was stored successfully; and then logging off from the database.

As a result of execution, a test script execution will generate an output which indicates whether the application successfully or unsuccessfully performed the test case (the test output).

Modern testing tools and frameworks have been developed so that test cases and test scripts can be created, modified and managed. Test cases and test scripts are designed to improve the quality of the subject under test (e.g., reduce the number of bugs; eliminate or reduce the potential for catastrophic failure—"crashing"; improve failure recovery; etc.). Unfortunately, for many software applications, application quality has often been overshadowed by the desire to provide more and richer features. However, as the reliance on software applications increases and software is used in many more critical situations where lack of software application quality is simply not acceptable, reliability and quality has become far more important. For example, one methodology that is being promoted in the application development community is known as "Extreme Programming". Extreme programming is a software development methodology that is based on values of simplicity, communication and feedback. One of the core principles recommends that the test cases and scripts be created before the actual software application (which will be tested by the test scripts) is created. This extreme programming methodology results (as does other methodologies) in the creation of large numbers of tests cases.

In the case where the software application is created using object oriented programming, there are often several test cases and scripts developed for a single object. A single software application may involve thousands or tens of thousands (or more) objects. As a result of both of these factors (improved focus on software application and new programming methodologies), the test case base (i.e., the collection of test cases and scripts for an application) becomes very large and complex. As a result of the size and complexity of the test case base, the logistics of managing the test cases and the scripts which implement these test cases becomes very onerous to the development team. For example, it may be difficult to ascertain whether: a script exists which corresponds to a test case; to which part of the application a test case or test script pertains; etc. Also, developers are often under pressure to use test cases and scripts to test components and system level testing using cases and scripts designed for other scenarios. This type of misapplication of test cases and scripts often results in portions of the application (e.g., components) being only partially tested. Further, as developers and test team members develop test cases and scripts either completely manually or using a combination of test tools which automate the generation of test scripts together with manual modifications or extensions, test scripts and cases developed by different people often have very different structures and quality. Finally, while new methodologies may be developed to address some of these shortcomings involving test cases and scripts, such methodologies would not address the shortcomings which exist in test cases and scripts which already exist.

Accordingly, addressing, at least in part, the shortcomings noted above, thus improving the testing of computer applications, is desired.

SUMMARY OF THE INVENTION

The present invention is directed to deriving formal test case definitions from a test script.

A model of a test case is created which is used to formally define the various portions of a test case and the test script which implements the test case. In one aspect, the invention processes an existing test script to identify the components in the test script which correspond to the portions defined in a model of a test case. These identified portions are then used to create a test script which corresponds to the structure of the test model.

The model created may be compliant with testing models promulgated by standards or quasi-standard groups. The model is a high level description of a test script and hides the implementation details which are usually irrelevant to the test case design, test case management and test analysis (e.g., whether there is sufficient test case coverage for a particular feature of a software application). Moreover, once a test script has been processed such that the underlying test case (or portions thereof) has been "mapped" to the test case model, analysis of whether the test case effectively tests or addresses the requirements for the subject under test is made simpler for developers. This enables the developers to more effectively use their time and energy (rather than spend it on test case management). Furthermore, ensuring that test cases are mapped to a clear and understandable model enables test cases to be more easily understood thus allowing for more test cases to be reused or adapted to other areas.

Additionally, embodiments of the invention enable the creation of test scripts, in one or more languages, from a test case which conforms to the model. As will be appreciated, the model employed could be modified or altered to provide additional advantages such as enabling extensions of the model to be created.

In accordance with an aspect of the present invention there is provided a method of creating a test script comprising: mapping at least a portion of received input data to an exemplary model of a test script; generating a test script using said mapped portion of said received input data, said test script conforming to said exemplary model.

In accordance with another aspect of the present invention there is provided a computer readable media storing data and instructions, said data and instructions when executed by a computer system adapt said computer system to: map at least a portion of received input data to an exemplary model of a test script; generate a test script using said mapped portion of said received input data, said test script conforming to said exemplary model.

In accordance with still another aspect of the present invention there is provided a method of creating a test script comprising: means for mapping at least a portion of received input data to an exemplary model of a test script; means for generating a test script using said mapped portion of said received input data, said test script conforming to said exemplary model.

In accordance with still another aspect of the present invention there is provided a conforming test script conforming to an exemplary model of a test script, said conforming test script generated by: mapping at least a portion of a received non-conforming test script to said exemplary model of a test script; generating said test script using said mapped portions of said received input data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIG. 3A illustrates an exemplary, existing test script of FIG. 3;

FIG. 7 (which comprises FIGS. 7A-7E) is pseudo-code implementing the operations of FIG. 6.

DETAILED DESCRIPTION

Figure 1:
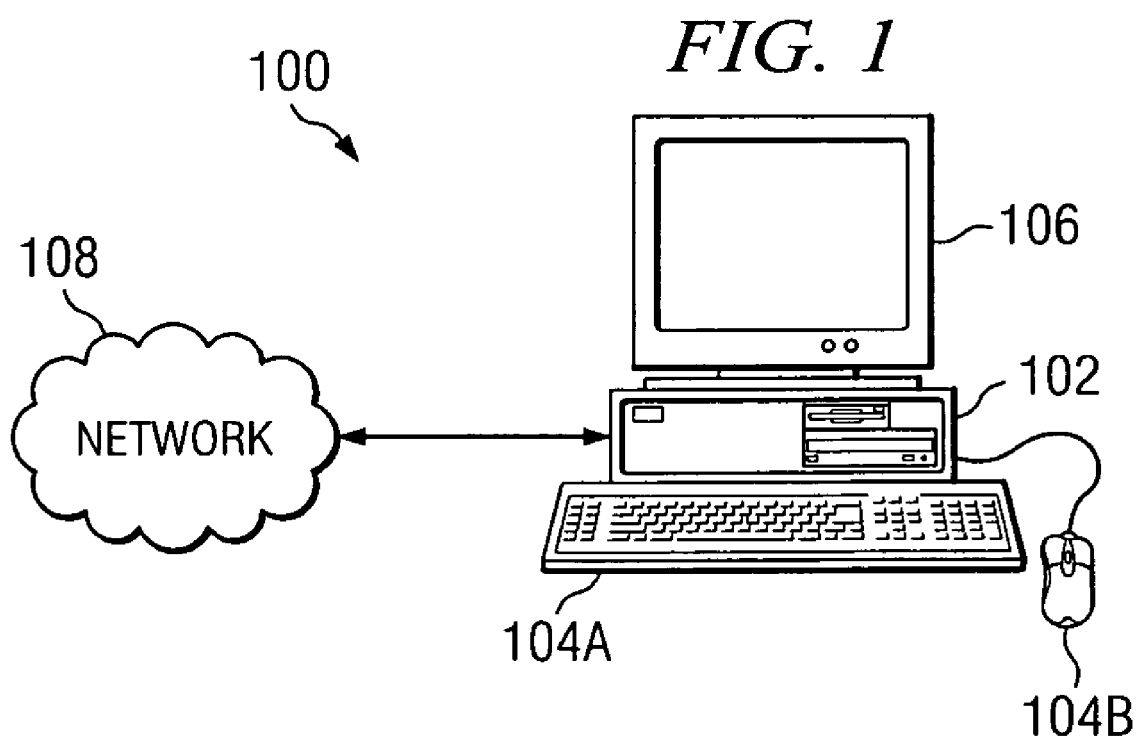
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. Computer system 100 may interact with other networked computer systems (not shown) providing application testing and analysis in a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
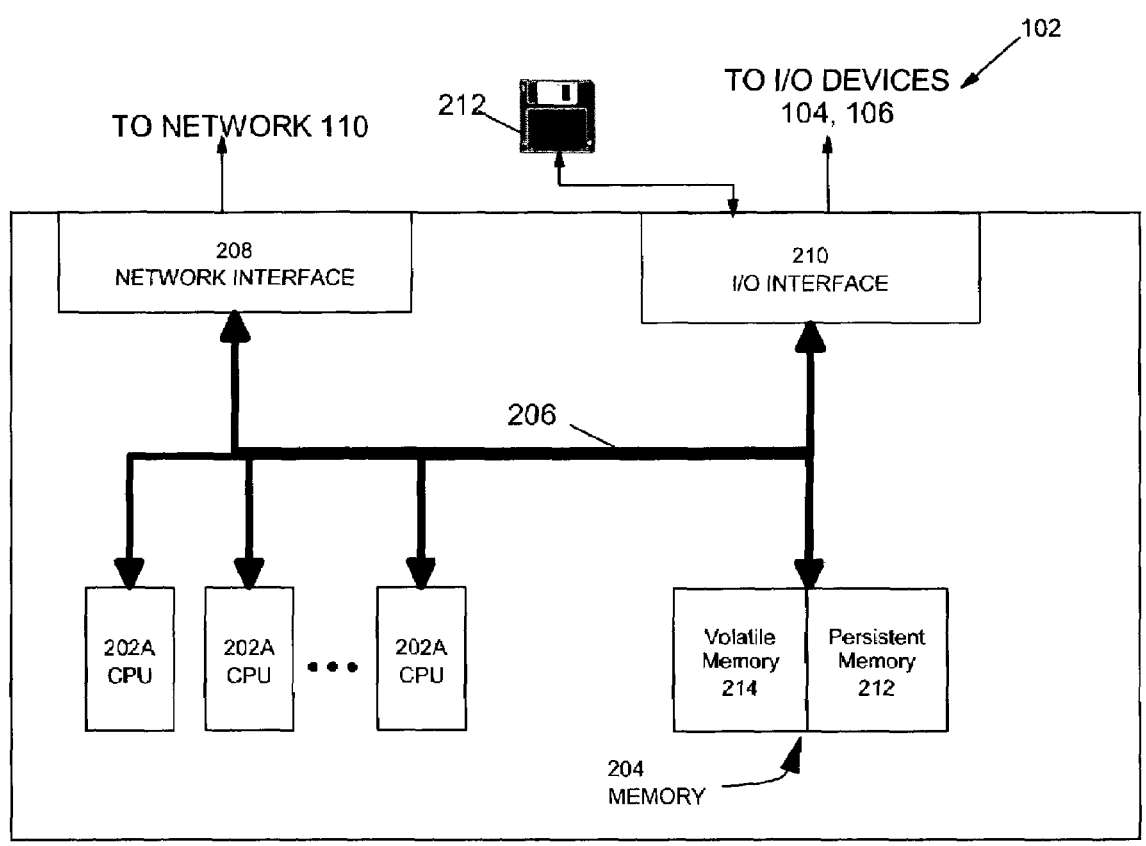
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
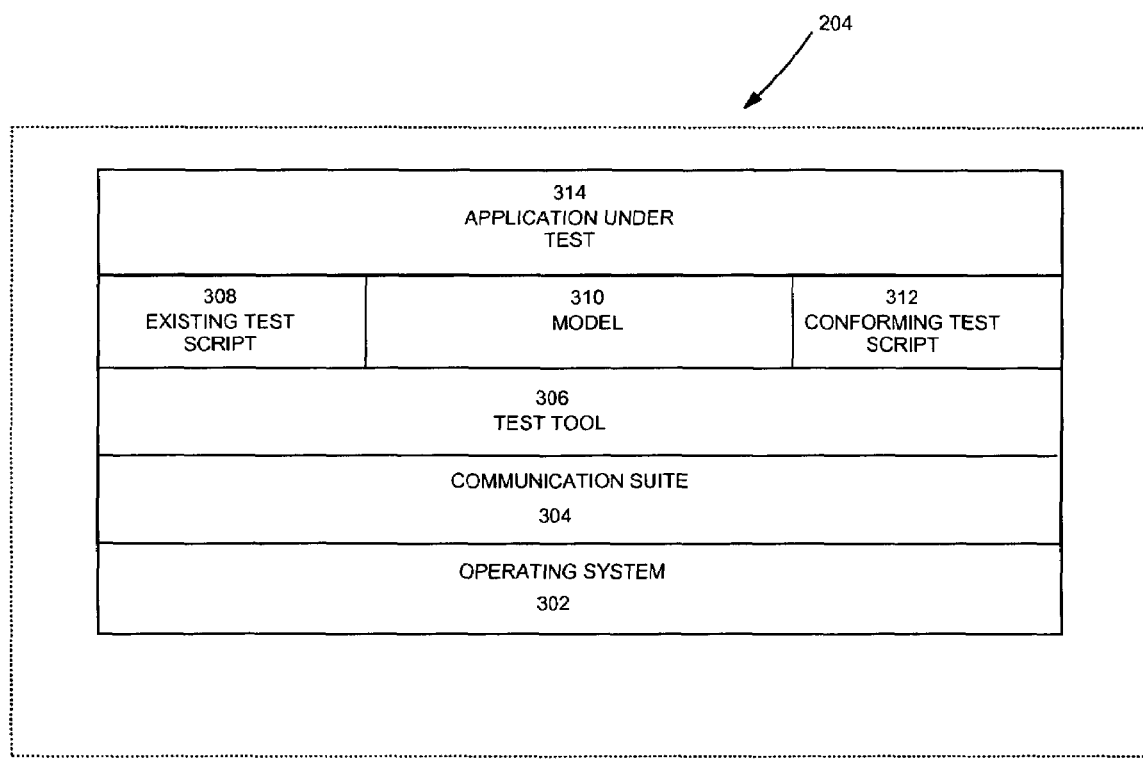
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 204 stores operating system (OS) 302, communications suite 304, test tool 306, existing test script(s) 308, model 310, conforming test script(s) 312 and the application (or portion thereof) under test 314 (hereinafter "application 314").

OS 302 is an operating system suitable for operation with a selected CPU 202 and the operations described herein. Multitasking, multithreaded operating systems such as, for example, IBM AIX™, Microsoft Windows NT™, Linux and the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Test tool 306 is used by testers and developers to generate test scripts 312 which, when executed, test aspects of application 314. Conforming test scripts 312 conform to the model 310 (described below in greater detail with reference to FIGS. 4 and 5). Additionally, test tool 306 is adapted to receive one or more existing test scripts 308 and identify information contained within an existing test script 308 which is also included in model 310. The identified information is then used to create a conforming test script 312 which corresponds to the existing test script 308 but conforms to model 310. In the exemplary embodiment test tool 306 includes a "runner" (the runtime portion which enables the execution of a test script 308 or 312). However, in alternative embodiments, test tool 306 could be separate from the runner required to execute a test script.

An existing test script 308 is typically a test script that was not created using test tool 306. In most cases, an existing test script 308 was coded manually by a developer/tester. That is, in most instances an existing test script 308 is a conventional test script known to those of ordinary skill in the art. In the exemplary embodiment described herein existing test scripts 308 are JUnit test scripts (available from the JUnit.org web site). That is, the test scripts in the exemplary embodiment use the JUnit.org framework and runners. The runners provided by the JUnit.org framework allow for both text and graphical based execution, monitoring and analysis of the executing and executed test scripts.

Test model 310 (hereinafter "model 310") models the organization of a test case and its corresponding test script. That is, the general layout, structure and data contained in a test case and test script is abstracted to a generic model which is then used to create additional test cases and test scripts. In the exemplary embodiment, the model 310 is graphically illustrated using the Unified Modeling Language (UML) from the Object Management Group, Inc. of Needham, Mass., USA (maintaining a web site at www.om-g.org). Object Management Group, Inc. is an open membership, not-for-profit consortium that produces and maintains computer industry specifications for interoperable enterprise applications. The UML specification, version 1.4, the contents of which are hereby incorporated herein by reference, is available at http://cgi.omg.org/docs/formal/01-09-67.pdf. The contents of the exemplary model, illustrated using UML, is described in greater detail below with reference to FIG. 5. While the exemplary model 310 is illustrated using UML and test scripts complying with the model 310 are more easily coded using an object oriented language such as Java™, other modeling languages (or even simple graphics) and other languages (object oriented, structured or other) could also be employed. However, as the exemplary embodiment of the present invention is implemented using test scripts 308, 312 that are coded using Java—a model 310 which lends itself to an object oriented implementation is preferred.

Model 310 is used by test tool 306 to identify information in an existing test script 308 which is included in model 310. The information identified by test 306 from an existing test script 308 is then structured and organized into a conforming test script 312 which conforms (i.e., complies with, follows, etc.) to model 310. Similarly, test tool 306 also uses model 310 to create conforming test scripts 312 which are not based on an existing test script 308 but are developed to implement a new test case.

Conforming test scripts 312 are test scripts which conform to model 310. That is, the structure, organization and data contained in a conforming test script 312 conforms to the model 310.

Conforming test scripts 312 in the exemplary embodiment are implemented in Java and use the JUnit.org runners for execution. Accordingly, conforming test scripts 312, in the exemplary embodiment, are similar to existing test scripts 308 in that both are coded in Java and both use the JUnit.org runners. A difference, however, is that the conforming test scripts 312 conform to model 310 whereas existing test scripts 308 do not conform to model 310. It is to be noted that while the coding languages and runners used by both existing and conforming test scripts 308, 312, respectively, are the same in the exemplary embodiment, alternative embodiments do not require such similarity. Existing and conforming test scripts 308, 312 could use different languages, different execution runners and the like. It is to be further noted, that while test tool 306 can be employed to create a conforming test script 312 which conforms to model 310 using an existing test script 308, test tool 306 can also generate a test script 312 which conforms to model 310 based on user input that is not based on an existing test script 308.

An exemplary test script 308, 312 using Java that can be executed using the JUnit.org runner is illustrated in FIG. 3A.

As described above, application under test 314 is an application (or portion thereof—e.g., a class, a component, etc.) which is tested by executing a test script 308 or 312 using a runner (or test tool 306 if, as in the exemplary embodiment, test tool 306 includes a runner).

Figure 4:
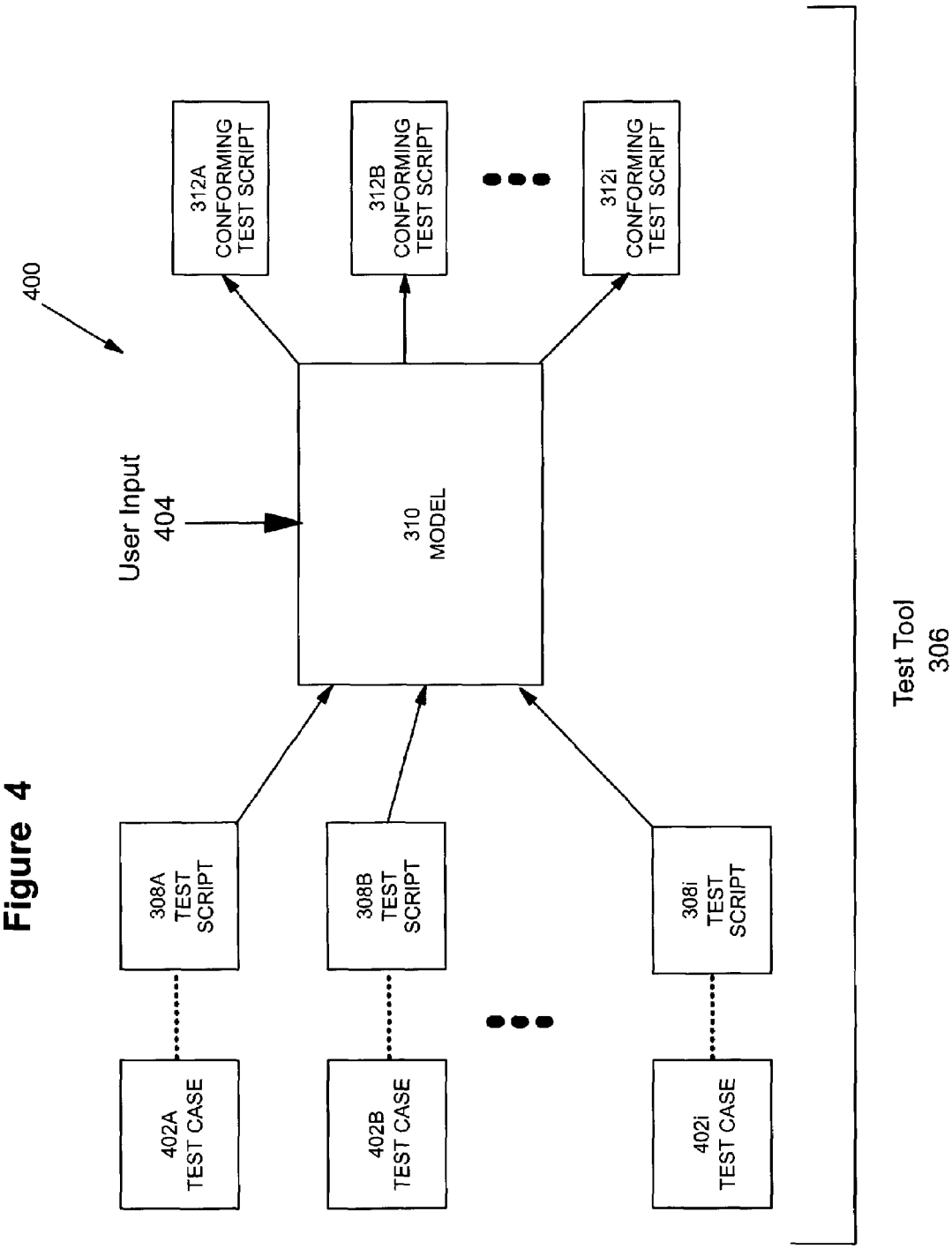
FIG. 4 illustrates in greater detail the interactions between portions of FIG. 3.

The interaction and relationship between existing test scripts 308, model 310 and generated or conforming test scripts 312 illustrating one aspect of the present invention is shown in FIG. 4. Each existing test script 308 (individually identified as test scripts 308, 308B, . . . , 308*i*) is associated with a corresponding test case 402 (individually 402A, 402B, . . . 402*i*). A test case 402 (e.g., test case 402B) describes (usually in plain English) the situation or scenario that is to be tested. The associated test script 308 (in this example, test script 308B) implements the plainly worded test case 402.

Using model 310, test tool 306 processes an input test script 308 to generate a conforming test script 312. That is, test tool 306 will identify relevant information contained within an existing test script 308 and populate (fully or partially) a new test script using this identified relevant information that conforms with model 310 (thus, creating a conforming test script 312). Alternatively, test tool 306 can generate a conforming test script 312 from user input 404 using model 310. That is, user input 404 received by test tool 306 is used to populate a test script 312 that conforms to the structure and organization of model 310.

Figure 5:
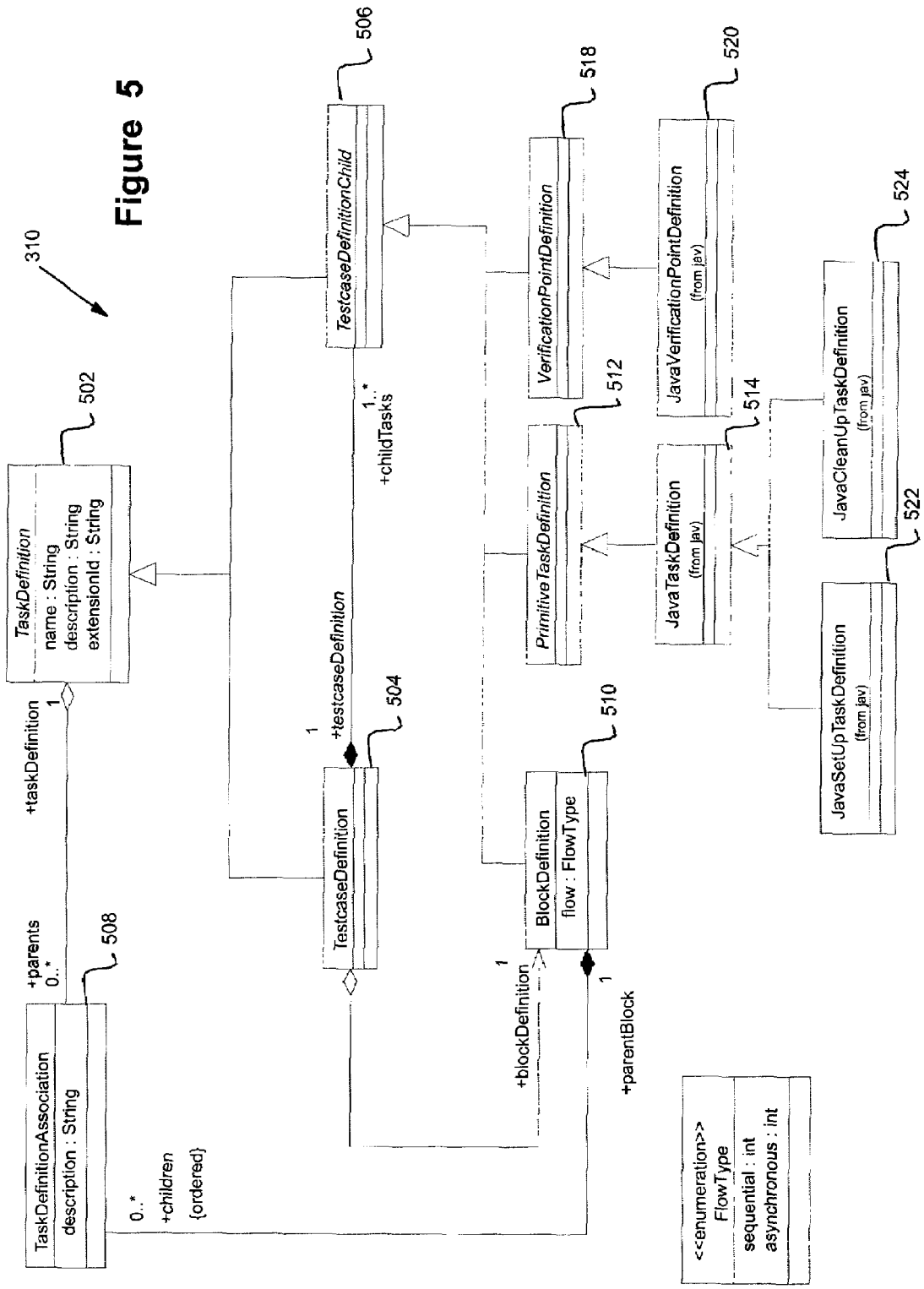
FIG. 5 illustrates, in a Unified Modeling Language (UML) model, an exemplary model illustrated in FIG. 3.

To better understand the embodiments of the invention described herein, an exemplary model 310 (using UML graphical notations) is illustrated in FIG. 5. As will be appreciated by those of ordinary skill in the art, different models 310 could be employed. Moreover, while the exemplary model 310 illustrated in FIG. 5 is conducive to creating object oriented test scripts 312 (using, for example, the Java language), other languages and language types/classes (e.g., structured languages, scripted languages, etc.) could equally be employed.

Referencing FIG. 5, a base or abstract class for a TaskDefinition 502 is illustrated (base or abstract classes are identified in FIG. 5 by the italicized text in the upper most descriptor portion—i.e., heading). TaskDefinition 502 will include attributes name, description and extensionid (all strings) which describe the name of the test case, the description of the test case and a unique identifier, respectively.

Each instantiation of abstract class TaskDefinition 502 is associated with only one TaskDefinitionAssociation 508. In the exemplary embodiment, TaskDefinitionAssociation class 508 is a helper class which provides a flexible way to link tasks with blocks.

Class TestcaseDefinition 504 and abstract class TestcaseDefinitionChild 506 are extensions of abstract class TaskDefinition 502. For each object instantiated from Definition class 504, one or more child tasks based on the TestcaseDefinitionChild abstract class 506 can be created.

As is known by those of ordinary skill in the art familiar with UML, the "by value" notation (identified by a solid diamond—see, for example, the relationship between TestcaseDefinition class 504 and TestDefinitionChild 506) and the "by reference" notation (identified by the diamond outline—see for example, the relationship between TaskDefintion 502 and TaskDefinitionAssociation 508) is specific to the particular embodiment. The "by value" notation indicates that the elements of a collection are dependent upon the container associated with those elements. In many embodiments, the "by value" notation suggests that the elements are serialized in the same file as the associated container. The "by reference" notation, in contrast, usually indicates that the related elements are serialized in different files.

Each object instantiated from a TestcaseDefinition class 504 is associated with one object instantiated from the BlockDefinition class 510. The BlockDefinition class 510 includes one attribute, flow, having the type FlowType. In the exemplary embodiment the FlowType defines the execution flow mechanism of the tasks at the block level. For example, the described embodiment provides for: "sequential" flows—i.e., tasks performed one after another; —"asynchronous"—i.e., tasks performed in parallel—or any other flow type a task scheduler may support.

Extensions of the abstract class TestcaseDefinitionChild abstract class 506 are the BlockDefinition class 510 and abstract classes PrimitiveTaskDefinition 512 and VerificationPointDefinition 518. The PrimitiveTaskDefinition abstract class 512 is extended by JavaTaskDefinition class 514. In turn, each object instantiated from JavaTaskDefinition class 514 is associated with a single object instantiated from JavaSetUpTaskDefinition class 522 and a single object instantiated from JavaCleanUpTaskDefinition class 524.

The various classes and their associated purpose in the exemplary embodiment which are illustrated in FIG. 5 are summarized in table form below.

| Class | Purpose |
| --- | --- |
| TestcaseDefinition 504 | the model 310 representation of the definition of a test case. This class provides common attributes, association and behaviour for different types of test cases. Basically the content of a TestcaseDefinition is a set tasks, verification points and other test cases organized in blocks. |
| BlockDefinition 510 | is the container of the tasks of a test case definition. This class provides some runtime behaviours such as execution flow (sequence or parallel execution). |
| JavaTaskDefinition 514 | is a particular type of task that allows the invocation of a particular method declared on any Java class or the execution of a code snippet or portion. |
| TaskDefinition 502 | the base class for all the elements that are used in a test case (the test case itself extends a TaskDefinition). |
| TestcaseDefinitionChild 506 | the base class for any element that will never have any child within a test case structure. In a another words, they are the leaf elements. |
| PrimitiveTaskDefinition 512 | base class for all the elements that perform a specific task on the subject under test while the test case is executed. A specific task could be a API method invocation which stimulates the subject under test. |
| VerificationPointDefinition 518 | base class for all the elements that perform an observation over how the subject under test reacted to a previous stimulation or that records the current status of the .subject under test. |
| JavaVerificationPointDefinition 520 | is a particular type of verification point to be used to validate the results produced by a Java task. |
| JavaSetUpTaskDefinition 522 | is a particular type of task that allow the set up of a block in a Java test case. |
| JavaCleanUpTaskDefinition 524 | is a particular type of task that allows for the clean up of a block in a Java test case. |

Figure 6:
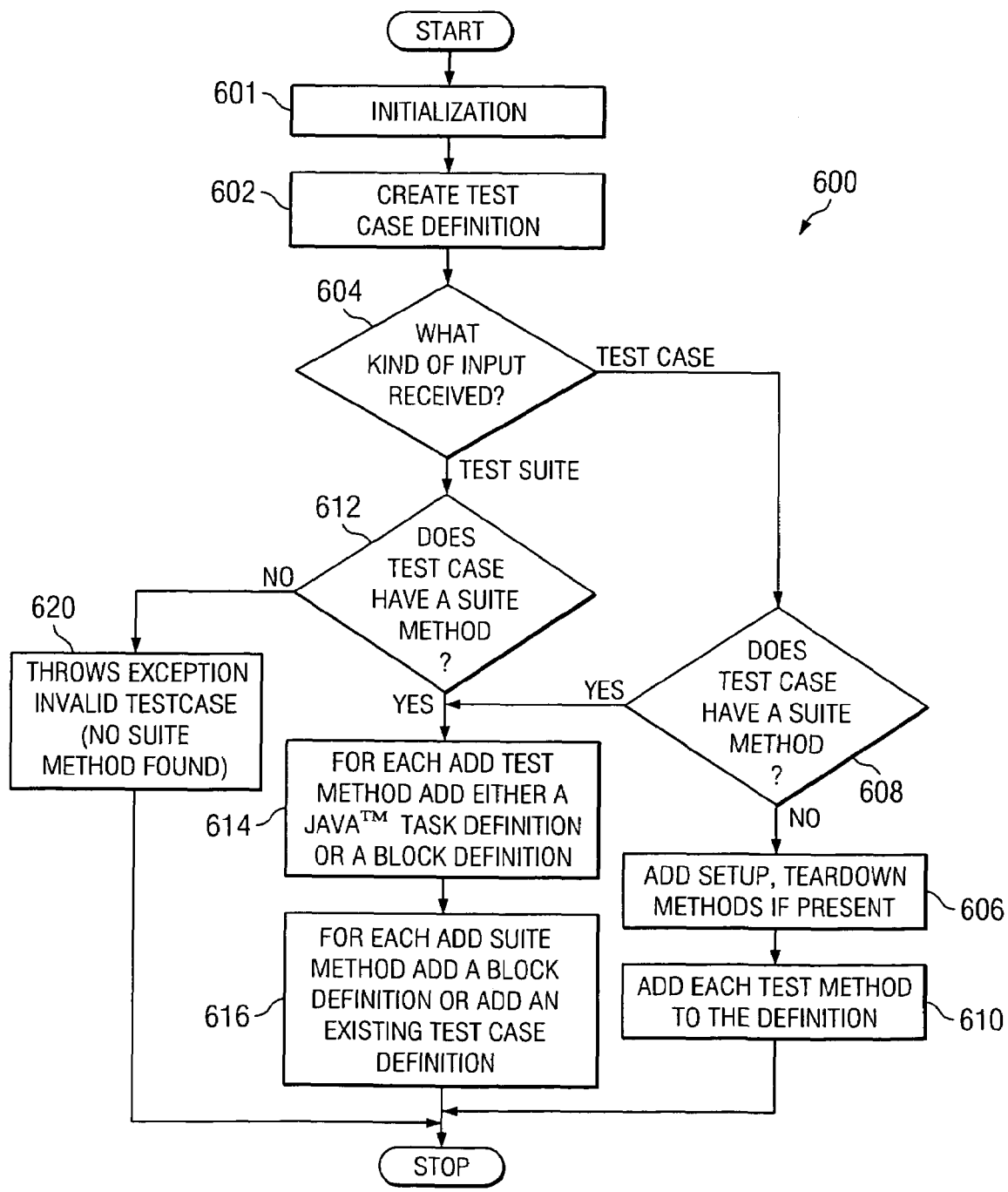
FIG. 6 illustrates operations performed by portions of FIGS. 3 and 3A.

The operations 600 of test tool 306, and interactions with model 310, test scripts 308 and 312, is illustrated by flow chart in FIG. 6. Exemplary pseudo-code 700 which implements operations 600 illustrated is illustrated in FIG. 7. FIG. 7, due to space limitations, consists of FIGS. 7A, 7B, 7C, 7D and 7E. Portions of pseudo-code 700 have been identified by the same reference numerals used in FIG. 6. These reference numerals identify portions of pseudo-code 700 which generally implement the corresponding operation illustrated in the flow chart of FIG. 6. Additional reference numerals (702-734) are used to identify selected portions of an operation.

Operations 600 are used to identify those portions of an existing test scripts 308 received by test tool 306; map those identified portions to the portions of model 310 and output a conforming test script 312. In order to understand the mapping function, it is first necessary to highlight some elements from the JUnit.org framework and the definition model being employed. As noted above, alternative embodiments could employ a framework and runners which are different from those provided by the JUnit.org organization. For example, while the exemplary embodiment employs a runner which executes JUnit compliant test cases, alternative runners, such as the Rational RobotJ runner, available from Rational Software Corporation of Lexington, Mass., could employed in alternative embodiments.

The JUnit framework main classes and their main methods are described below in greater detail to assist in the understanding of the exemplary.

The junit.framework.TestCase class encapsulates the logic of a test case and has the following main methods:

| Method | Purpose |
| --- | --- |
| Test methods | implements the logic of a unit test. Usually exercises a small portion of a class (although this is not requirement in alternative embodiments). If the TestCase does not provide a suite( ) method the framework runner will execute all the test methods of the test case in the sequence they were created. |
| setUp | executed by the framework runner before each test method. |
| tearDown | executed by the framework runner after each test method. |
| suite | allows the test case developer to select which test methods will be executed and also allows the invocation of others test cases. Whenever a test case is executed the framework runner will introspect the class looking for this method. |

The junit.framework.TestSuite class is used for test suites. As noted above, a test suite is essentially a collection of test cases/scripts. As such, a test suite can be composed by test methods from different test cases. The main methods are:

| Method | Purpose |
| --- | --- |
| addTest | Adds a test method or another test suite to the suite |
| addTestSuite | Adds all the test methods from a specific test script to the suite |

During a test case execution, after performing a validation (or verification point), for example, the JUnit.org framework relies on the Java exception mechanism to log any unexpected result. Developers employing the JUnit.org framework should define the tests to be applied and when to throw an exception. This is usually done by calls to the variations of "assert" provided as indicated on the last line of the method "testSimpleAdd" in FIG. 3A.

Referencing primarily FIGS. 6 and 7, test tool 306 performs an initialization (601) which loads in an existing test script 308 (identified in the exemplary embodiment by the file name "JUnitTestCase.java") (702). Once the existing test script 308 has been loaded, test tool 306 loads in a model (or template) which corresponds to model 310. A template will be created (602) and populated by data identified and copied from the existing test script 308. The populated template, as a result of this process of identification and population, becomes conforming test script 312. Once the processing is completed (operations 604-616), the conforming test script 312 is saved to a file (704). If a conforming test script 312 already exists, then the conforming test script 312 will be updated through the addition of new or modification of existing tasks.

During processing (operations 604-608), test tool 306 determines whether the input file (an existing test script 308—"JUnitTestCase.java") is a test suite or only a test case (604). This determination is performed by determining whether the existing test script extends either the TestCase type or the TestSuite type.

If test tool 306 determines that the input existing test case 308 is a test case (and not a test suite), then there still exists the possibility that the identified test case contains a test suite. Accordingly, a further determination is made by the exemplary test tool 306 to ascertain whether the identified test case contains a test suite (608, 706).

Assuming that test tool 306 has identified a test case (604) that does not contain a test suite (608), then test tool 306 creates test case definition object (614) corresponding to object 504 (FIG. 5). The identified test case (602, 604) is then parsed to identify the test, setUp and tearDown methods (described above with reference to the junit.framework.TestCase class) (606, 706). The test methods are those functions or operations (usually implemented as methods in Java) which, when executed manipulate or exercise the subject under test (i.e., "test" the subject under test).

The exemplary embodiment uses Java model elements. The Java model is a model of the Java language specification implemented in Java—it covers all the elements used in a Java source file.

Of Note Are IType and IMethod, Described Briefly Below:
  IType—represents either a source type in a source file (either a top-level type or a member type) or a binary type in a class file (which provides access to all elements of a Java class—methods, fields etc).
  IMethod—represents a method (or constructor) declared in a type (provides the parameters, the parameter types, return type, modifiers, exceptions etc. of the method).

For an implementation reference, see the org.eclipse.jdt.core at "www.eclipse.org".

Initially, a parser is used to load the testcases Java source code in a Java model (the internal Java class representation) and then using the algorithm presented on FIG. 7 to populate a test script conforming to model 310.

The source code parser in the exemplary embodiment may be implemented through some slight modifications of a conventional Java parser. The source code parser implements the following functions (methods) illustrated in FIG. 7:
  public IType loadClass(String fileName)—loads the source file into an internal representation. IType is the equivalent of a Java class or interface and IType is part of the Java model;
  public boolean extendsTestCase(IType type)—checks if "type" extends junit.framework.TestCase (it needs to navigate the hierarchy of "type" IType object to check if one of the parents is junit.framework.TestCase);
  public boolean extendsTestSuite(IType type)—checks if "type" extends junit.framework.TestSuite (it needs to navigate the hierarchy of "type" IType object to check if one of the parents is junit.framework.TestSuite);

public boolean hasSuiteMethod(IType o)—checks if class "o" has a "suite()" method (it needs to search in the methods list of "o" htype for a method with "static public Test suite()" signature);

public void parseTestMethods(IType type, Vector testMethods)—navigates the Java model represented by "type" IType and sets the "testMethods" vector with all the methods IMethod (the Java model representation of a method) that have the following signature "public . . . testXXX()" where ". . . " is any type and "XXX" is any string;

public void parseSuiteMethod(IMethod method, Vector suiteMembers)—navigates the Java model of the suite() method represented by "method" IMethod and sets the "suiteMembers" vector with all the methods IMethod or types IType that are part of the "suite".addTest() and "suite".addTestSuite() statements where "suite" is an object of type junit.framework.TestSuite or a subtype ojunit.framework.TestSuite type. An IType is returned when the parameter of addTest or addTestSuite is a class (see AnotherMoneyTest.class in FIG. 3A) and a method if the parameter is like "new MoneyTest("testSimpleAdd")" (see FIG. 3A) where MoneyTest extends a TestCase (the method is looked up in the MoneyTest type by the string content of the parameter of the constructor in the previous example);

public String getJavaDescription(IMethod method)—this method retrieves the Java doc of the method represented by "method" IMethod object (the Java model loader sets this information on all elements of the Java model—method, type, statement, etc.);

public String getJavaDescription(IType type)—this is similar to the getJavaDescription method, but is for a "type" rather than "method";

public String getAssertsDescription(IMethod method)—this is similar to the getJavaDescription method, but in this case the getAssertsDescription is used for all statements that contain an assert method that are part of "method" IMethod; and public IMethod getSuiteMethod(IType type)—returns the "suite" method of the "type" IType (search through the child methods of "type" and returns the "suite" method or null otherwise)

Once the individual methods (test methods and the associated setUp and tearDown methods) have been identified (through execution of pseudo-code 730), these methods are used to populate objects corresponding to the JavaTaskDefinition, JavaSetUpTaskDefinition, and JavaCleanUpTaskDefinition classes 514, 522, and 524, respectively. Test tool 306 populates these objects by iterating through each test method identified (610, 710).

If, instead of determining that the existing test script 308 is a test case, test tool 306 determines that the input file is a test suite (604), test tool 306 determines whether the identified test suite includes a suite method (612). If the identified test suite does not include a suite method, the test suite is invalid and an exception is thrown (620). However, if the identified test suite is valid (i.e., the test suite contains a suite method), then for each add test method, an object instantiated from JavaTaskDefinition class 514 is created or an object instantiated from BlockDefinition class 510 is created (614) as described below.

During operation 614, test tool 306 parses the test suite (712) to identify the first level of suite members. That is, test tool 306 parses the test suite to identify the first level of tasks in a test case hierarchy. The first level of tasks are those children that are the children of the top level block or the block associated with the root test case. Pseudo-code 712 indicates that test tool 306 will parse the suite method, statement by statement, and for each addTest or addTestSuite, test tool 306 will return a list of IMethod (see pseudo-code 732 in FIG. 7) or Itype (see pseudo-code 734 in FIG. 7)—objects which form part of a Java model. During the execution of code corresponding to pseudo-code 730, test tool 306 will create corresponding test case model objects. These objects can be instantiated from the BlockDefinition 510, JavaTaskDefinition 514 or TestcaseDefinition 504 classes—as children of the current task.

Upon completion of the parsing of the identified test suite, test tool 306 iterates through each method identified (714). During the iteration loop 714, if a selected identified method is a test suite (716), an object corresponding to BlockDefinition class 510 is created (716) (a BlockDefinition object acts as a container of the tasks of a test case definition). Once a BlockDefinition object has been created, the test case contained in the test suite method being processed is passed to pseudo-code portion 730 to derive any non-top level test cases or test suites contained therein (720). Pseudo-code 730 is executed by test tool 306 to derive and test suites (722) or iterates through the test methods of a test case (728, 724).

If during the iteration loop 714, a selected identified method is a test case (718), then test tool 306 derives the test methods (718). As noted above, an individual test method is derived and populates the template used to create a conforming test script 312 through the execution of pseudo-code 730. Pseudo-code 730 ensures that the test method and its associated setUp and tearDown methods are identified and the data therein is used to populate objects instantiated from JavaTaskDefinition, JavaSetUpTaskDefinition, and JavaCleanUpTaskDefinition classes 514, 522, and 524, respectively, of model 310.

Referring back to FIG. 6, operations 614 and 616 (described above) are similarly performed when a previously identified test case (604) is determined to contain a test suite (608).

As a result of operations 600, an input existing test script 308 is processed and a conforming test script 312 is generated by test tool 306 which conforms to model 310.

As will be appreciated by those skilled in the art, modifications to the above-described embodiment can be made without departing from the essence of the invention. For example, alternative embodiments could alter the operations performed for parsing the input test scripts 308 or the test case model 310. Other embodiments and variations will also be apparent to those of ordinary skill in the art.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method of creating a test script comprising:
   mapping at least a portion of received input data to an exemplary test script model, wherein said received input data comprises at least one of user data and an existing test script, and wherein said mapping includes:
   identifying portions of said received input data which correspond to an existing test case and portions of said received input data which correspond to an existing test suite, wherein said existing test case is associated with said existing test suite; and generating said test script using said mapped portion of said received input data, said test script conforming to said exemplary test script model, wherein said generating includes:

for said portions of said received input data which correspond to said existing test case:

generating code forming part of said test script, which corresponds to operations in said portions of said received input data, which correspond to a test which exercise a subject under test, said generated code conforming to said exemplary test script model; and for said portions of said received input data which correspond to said existing test suite:

generating code forming part of said test script, which correspond to said existing test case in said portions of said received input data, which correspond to a conforming test case, said generated code conforming to said exemplary test script model.

2. The method of claim 1, further comprising:

creating a template conforming to said exemplary test script model; and wherein said generating comprises populating said template with said mapped portion of said received input data.

3. The method of claim 2, wherein said mapping comprises for each test case forming part of said received input data, identifying those operations which exercise a subject under test; and wherein said generating further comprises populating said template with said identified operations into portions of said template such that said template conforms with said exemplary test script model.

4. The method of claim 3, wherein said generating further comprises:

populating said test script with additional set up and tear down operations.

5. The method of claim 1, wherein said generating further comprises:

for said portions of said received input data which correspond to said existing test suite:

generating code forming part of said test script, which correspond to said existing test suite in said portions of said received input data, which correspond to a conforming test suite, said generated code conforming to said exemplary test script model.

6. A computer readable media storing data and instructions, said data and instructions when executed by a computer system adapt said computer system to:

map at least a portion of received input data to an exemplary test script model, wherein said received input data comprises at least one of user data and an existing test script, and wherein adapting said computer system to map includes adapting said computer system to:

identify portions of said received input data which correspond to an existing test case and portions of said received input data which correspond to an existing test suite, wherein said existing test case is associated with said existing test suite; and generate a test script using said mapped portion of received input data, said test script conforming to said exemplary test script model, wherein adapting said computer system to generate said test script includes adapting said computer system to:

for said portions of said received input data which correspond to said existing test case:

generate code forming part of said test script, which corresponds to operations in said portions of said received input data, which correspond to a test which exercise a subject under test, said generated code conforming to said exemplary test script model; and for said portions of said received input data which correspond to an existing test suite:

generate code forming part of said test script, which correspond to said existing test case in said portions of said received input data, which correspond to a conforming test case, said generated code conforming to said exemplary test script model.

7. The computer readable media of claim 6, said computer system further adapted to:

create a template conforming to said exemplary test script model; and wherein said adapting said computer system to generate said test script comprises data and instructions adapting said computer system to populate said template with said mapped portion of said received input data.

8. The computer readable media of claim 7, wherein said adapting said computer system to map comprises adapting said computer system to, for each test case forming part of said received input data, identify those operations which exercise a subject under test; and wherein said adapting said computer system to generate said test script further comprises adapting said computer system to populate said template with said identified operations into portions of said template such that said template conforms with said exemplary test script model.

9. The computer readable media of claim 8, wherein said adapting said computer system to generate said test script further comprises:

adapting said computer system to populate said test script with additional set up and tear down operations.

10. The computer readable media of claim 6, wherein said adapting said computer system to generate said test script further comprises:

for said portions of said received input data which correspond to said existing test suite:

generate code forming part of said test script, which correspond to said existing test suite in said portions of said received input data, which correspond to a conforming test suite, said generated code conforming to said exemplary test script model.

11. A system for creating a test script, comprising:

a bus system;

a storage device connected to the bus system, wherein the storage device includes a set of instructions; and a processing unit connected to the bus system, wherein the processing unit executes the set of instructions to map at least a portion of received input data to an exemplary test script model, wherein said received input data comprises at least one of user data and an existing test script, and wherein said set of instructions to map include identifying portions of said received input data which correspond to an existing test case and portions of said received input data which correspond to an existing test suite, wherein said existing test case is associated with said existing test suite; and to generate said test script using said mapped portion of said received input data, said test script conforming to said exemplary test script model, wherein said set of instructions to generate include:

for said portions of said received input data which correspond to said existing test case:
  generating code forming part of said test script, which corresponds to operations in said portions of said received input data, which correspond to a test which exercise a subject under test, said generated code conforming to said exemplary test script model; and for said portions of said received input data which correspond to said existing test suite:
  generating code forming part of said test script, which correspond to said existing test case in said portions of said received input data, which correspond to a conforming test case, said generated code conforming to said exemplary test script model.

12. The system of claim 11, wherein the processing unit executes a further set of instructions to create a template conforming to said exemplary test script model; and wherein the set of instructions to generate includes a set of sub-instructions to populate said template with said mapped portion of said received input data.

13. The system of claim 12, wherein the set of instructions to map includes for each test case forming part of said received input data, a set of sub-instructions to identify those operations which exercise a subject under test; and wherein the set of instructions to generate includes a further set of sub-instructions to populate said template with said identified operations into portions of said template such that said template conforms with said exemplary test script model.

14. The system of claim 13, wherein the set of instructions to generate includes a still further set of sub-instructions to populate said test script with additional set up and tear down operations.

* * * * *